US012338685B2

(12) United States Patent
Vargas

(10) Patent No.: US 12,338,685 B2
(45) Date of Patent: Jun. 24, 2025

(54) STABILIZED LADDER ASSEMBLY

(71) Applicant: Maximino Vargas, New York, NY (US)

(72) Inventor: Maximino Vargas, New York, NY (US)

( * ) Notice: Subject to any disclaimer, the term of this patent is extended or adjusted under 35 U.S.C. 154(b) by 861 days.

(21) Appl. No.: 17/551,866

(22) Filed: Dec. 15, 2021

(65) Prior Publication Data

US 2023/0184034 A1 Jun. 15, 2023

(51) Int. Cl.
*E06C 1/22* (2006.01)
*E06C 7/14* (2006.01)
*E06C 7/42* (2006.01)

(52) U.S. Cl.
CPC .................. *E06C 1/22* (2013.01); *E06C 7/14* (2013.01); *E06C 7/423* (2013.01)

(58) Field of Classification Search
CPC ..... E06C 1/02; E06C 1/14; E06C 1/16; E06C 1/20; E06C 1/22; E06C 1/38; E06C 1/39; E06C 7/14; E06C 7/18; E06C 7/188; E06C 7/42; E06C 7/423
USPC .......................................................... 182/172
See application file for complete search history.

(56) References Cited

U.S. PATENT DOCUMENTS 1,102,428 A * 7/1914 Newman et al. ....... E06C 7/423 248/351
1,526,654 A * 2/1925 Yordy ....................... E06C 1/20 182/172
3,642,240 A * 2/1972 Hershey ..................... E06C 7/14 248/210
3,842,936 A * 10/1974 De Luca ................... E06C 7/14 108/26
3,901,354 A * 8/1975 Grebausky ................ E06C 1/20 182/172
4,433,754 A * 2/1984 Beach ....................... E06C 1/38 182/172
4,872,529 A * 10/1989 Viets ....................... E06C 7/423 182/172
5,370,263 A * 12/1994 Brown ...................... E06C 7/14 220/756
5,505,302 A * 4/1996 Ferley ...................... B25H 3/02 248/210
5,547,080 A * 8/1996 Klimas .................. B25H 3/023 248/211

(Continued)

FOREIGN PATENT DOCUMENTS

CN 221088988 U * 6/2024
DE 19855144 A1 * 6/1999 ............... E06C 1/22

(Continued)

*Primary Examiner* — Ryan D Kwiecinski

(57) ABSTRACT

A stabilized ladder assembly includes a step ladder that has a set of climbing legs and a set of support legs each is hingedly coupled to a top support. A pair of lateral supports is each pivotally disposed on the step ladder. Each of the lateral supports is positionable in a deployed position to engage a support surface for inhibiting the step ladder from tipping laterally on the support surface. Each of the lateral supports is positionable in a stored position having the lateral supports resting against the step ladder. A toolbox is suspended on the step ladder such that the toolbox is accessible to a user when the user climbs the step ladder. Additionally, the toolbox is oriented to extend along a vertical axis when the step ladder is positioned in a deployed position.

10 Claims, 4 Drawing Sheets

(56) References Cited

U.S. PATENT DOCUMENTS

| | | | | | | |
|---|---|---|---|---|---|---|
| 5,582,269 | A | * | 12/1996 | Gugel | E06C 7/183 | 248/238 |
| 5,603,405 | A | * | 2/1997 | Smith | B25H 3/02 | 206/349 |
| 5,727,649 | A | * | 3/1998 | Buckley | E06C 7/14 | 248/210 |
| 5,740,883 | A | * | 4/1998 | Trank | E06C 7/14 | 248/210 |
| 5,913,380 | A | * | 6/1999 | Gugel | E06C 7/14 | 248/210 |
| 5,971,102 | A | * | 10/1999 | Brown | E06C 7/084 | 206/372 |
| D427,771 | S | * | 7/2000 | Trejo | D3/315 | |
| 6,098,748 | A | * | 8/2000 | Harper, Jr. | E06C 7/14 | 206/372 |
| 6,145,620 | A | | 11/2000 | Strunk | | |
| 6,892,858 | B1 | * | 5/2005 | Zupan | E04G 5/003 | 248/210 |
| 7,063,187 | B1 | * | 6/2006 | Lavigne | E06C 1/39 | 248/238 |
| 7,275,641 | B1 | * | 10/2007 | Purnell | B25H 3/02 | 220/826 |
| 7,370,726 | B1 | * | 5/2008 | Chavez | E06C 1/18 | 248/210 |
| 8,596,454 | B1 | * | 12/2013 | Carlson | B25H 3/06 | 248/210 |
| 8,636,144 | B1 | * | 1/2014 | Lawery | E06C 7/14 | 220/570 |
| 8,863,901 | B1 | * | 10/2014 | Kyle | E06C 7/14 | 182/129 |
| 9,359,819 | B1 | * | 6/2016 | Valadez | E06C 7/14 | |
| 10,040,605 | B1 | * | 8/2018 | Popier | E04F 21/06 | |
| 10,807,407 | B1 | * | 10/2020 | Huynh | B44D 3/12 | |
| 2001/0007343 | A1 | * | 7/2001 | McElhaney, Jr. | B25H 5/00 | 248/211 |
| 2002/0104709 | A1 | * | 8/2002 | Hines | B25H 3/006 | 182/129 |
| 2005/0150723 | A1 | * | 7/2005 | Wilson | E06C 1/39 | 182/129 |
| 2005/0258002 | A1 | * | 11/2005 | Sabo | E06C 7/14 | 182/129 |
| 2009/0200189 | A1 | * | 8/2009 | Fields | B25H 3/022 | 206/372 |
| 2009/0242580 | A1 | * | 10/2009 | Conner, Sr. | E06C 7/14 | 220/751 |
| 2012/0103726 | A1 | * | 5/2012 | Morfidis | E06C 7/14 | 182/129 |
| 2013/0270037 | A1 | * | 10/2013 | Pensieri | E06C 7/44 | 182/107 |
| 2016/0153235 | A1 | * | 6/2016 | Villar | E06C 7/14 | 220/475 |
| 2016/0208553 | A1 | * | 7/2016 | Wayland | E06C 7/423 | |
| 2017/0204662 | A1 | * | 7/2017 | Perdue | E06C 1/18 | |
| 2020/0270946 | A1 | * | 8/2020 | Lawery | B44D 3/125 | |
| 2021/0207436 | A1 | * | 7/2021 | Taylor | E06C 7/06 | |
| 2021/0246725 | A1 | * | 8/2021 | Wernberg | E06C 7/48 | |
| 2021/0404256 | A1 | * | 12/2021 | E Welch | B44D 3/122 | |
| 2022/0397000 | A1 | * | 12/2022 | Oxford | E06C 1/383 | |

FOREIGN PATENT DOCUMENTS

| | | | | | |
|---|---|---|---|---|---|
| DE | 20006224 | U1 | * | 8/2000 | E06C 7/14 |
| DE | 19855144 | C2 | * | 2/2001 | E06C 1/22 |
| DE | 20108300 | U1 | * | 8/2001 | E06C 7/14 |
| FR | 2835723 | A1 | * | 8/2003 | A47F 5/13 |
| GB | 2114098 | A | * | 8/1983 | E06C 7/14 |
| GB | 2353494 | A | * | 2/2001 | B25H 1/0014 |
| GB | 2464598 | A | * | 4/2010 | B28C 5/10 |
| NL | 2000517 | C2 | * | 9/2008 | B25H 3/02 |
| WO | WO-2006078807 | A2 | * | 7/2006 | E06C 7/14 |
| WO | WO-2011143742 | A1 | * | 11/2011 | E06C 7/14 |
| WO | WO2012085694 | | | 6/2012 | |
| WO | WO-2016044888 | A1 | * | 3/2016 | B25H 3/02 |

* cited by examiner

STABILIZED LADDER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to ladder devices and more particularly pertains to a new ladder device for laterally stabilizing a step ladder for climbing. The device includes a step ladder that has a pair of lateral supports that each angle laterally away from the step ladder and engage a support surface. In this way the lateral supports inhibit the step ladder from tipping laterally. The device includes a toolbox that is suspended from the step ladder for storing tools. The device includes a light emitter that is pivotally disposed on the step ladder.

(2) Description of Related Art Including Information Disclosed Under 37 CFR 1.97 and 1.98

The prior art relates to ladder devices including a toolbox that mounts on top of a step ladder for storing tools. The prior art discloses a work support device that is slidably integrated into a step ladder for supporting an object above a step ladder. The prior art discloses a tool tray that is mountable to a top of a step ladder. The prior art discloses a step ladder that includes a pair of lateral supports that angle downwardly to the ground for stabilizing the step ladder. The prior art discloses a toolbox that mounts to a top of a step ladder and which includes a pair of buckets that each extend laterally away from the step ladder. The prior art discloses a step ladder which includes a pair of vertical supports that each has an adjustable height for engaging a ceiling for stabilizing the step ladder.

BRIEF SUMMARY OF THE INVENTION

An embodiment of the disclosure meets the needs presented above by generally comprising a step ladder that has a set of climbing legs and a set of support legs each is hingedly coupled to a top support. A pair of lateral supports is each pivotally disposed on the step ladder. Each of the lateral supports is positionable in a deployed position to engage a support surface for inhibiting the step ladder from tipping laterally on the support surface. Each of the lateral supports is positionable in a stored position having the lateral supports resting against the step ladder. A toolbox is suspended on the step ladder such that the toolbox is accessible to a user when the user climbs the step ladder. Additionally, the toolbox is oriented to extend along a vertical axis when the step ladder is positioned in a deployed position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
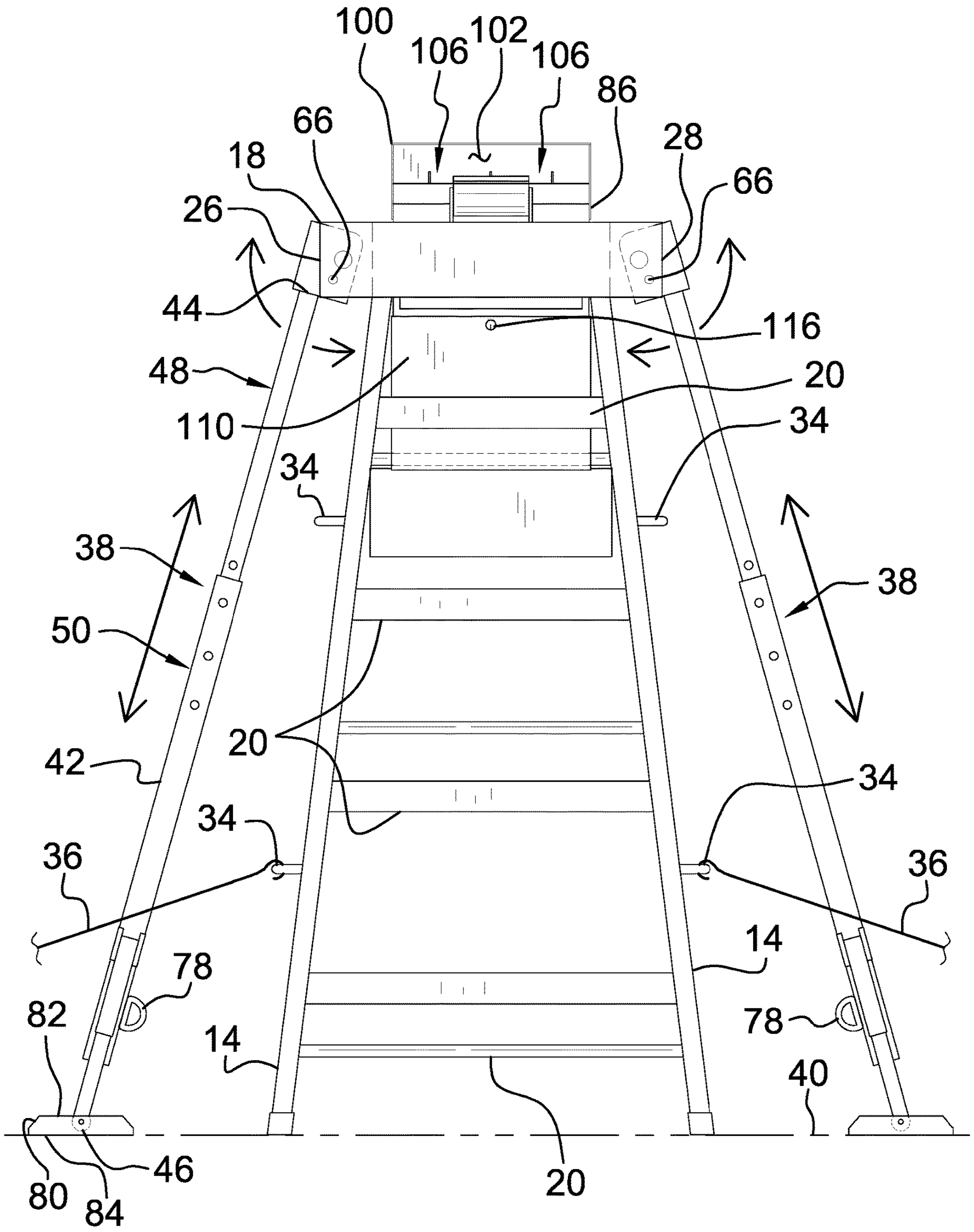
FIG. 1 is a front view of a stabilized ladder assembly according to an embodiment of the disclosure.
Figure 2:
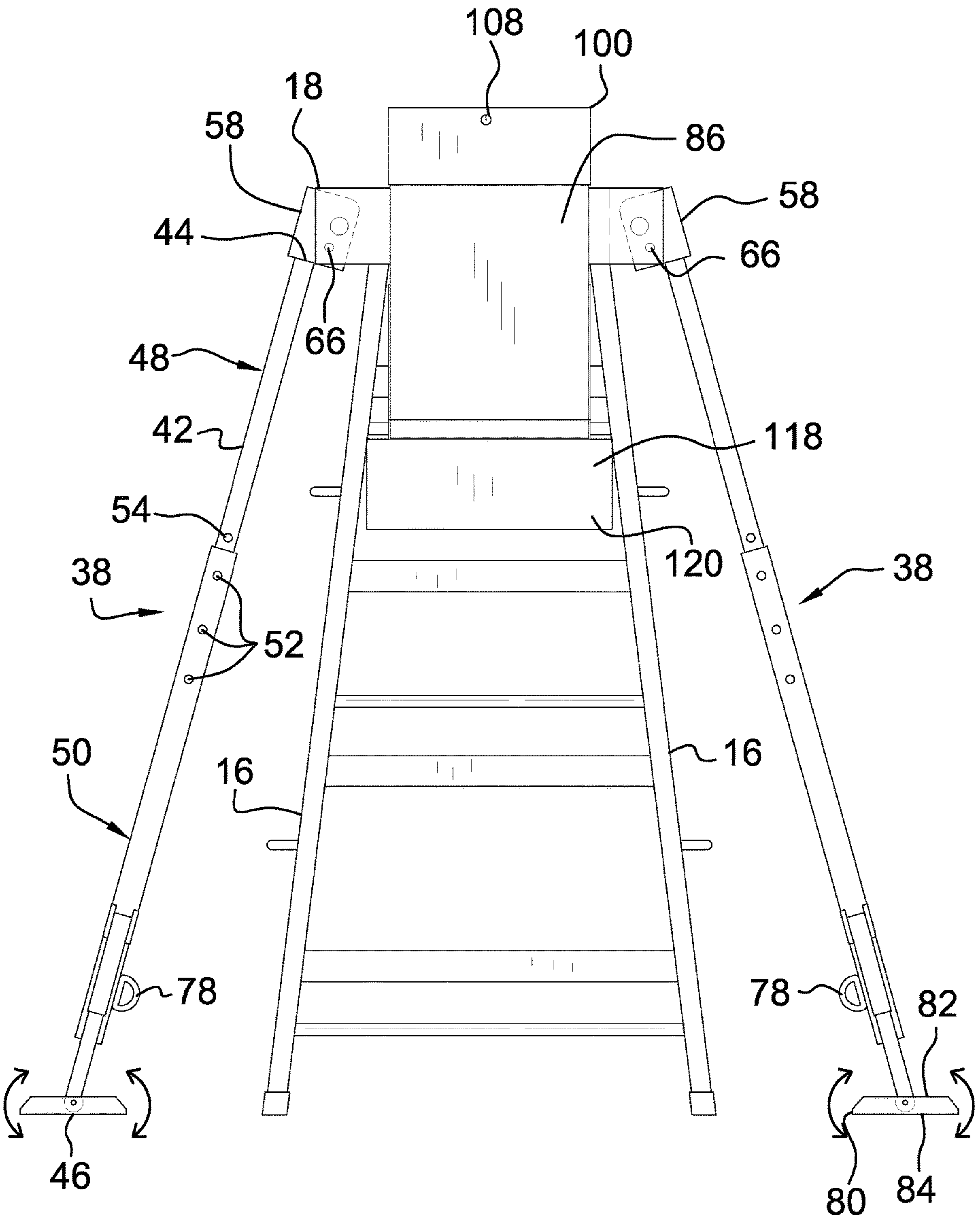
FIG. 2 is a back view of an embodiment of the disclosure.
Figure 3:
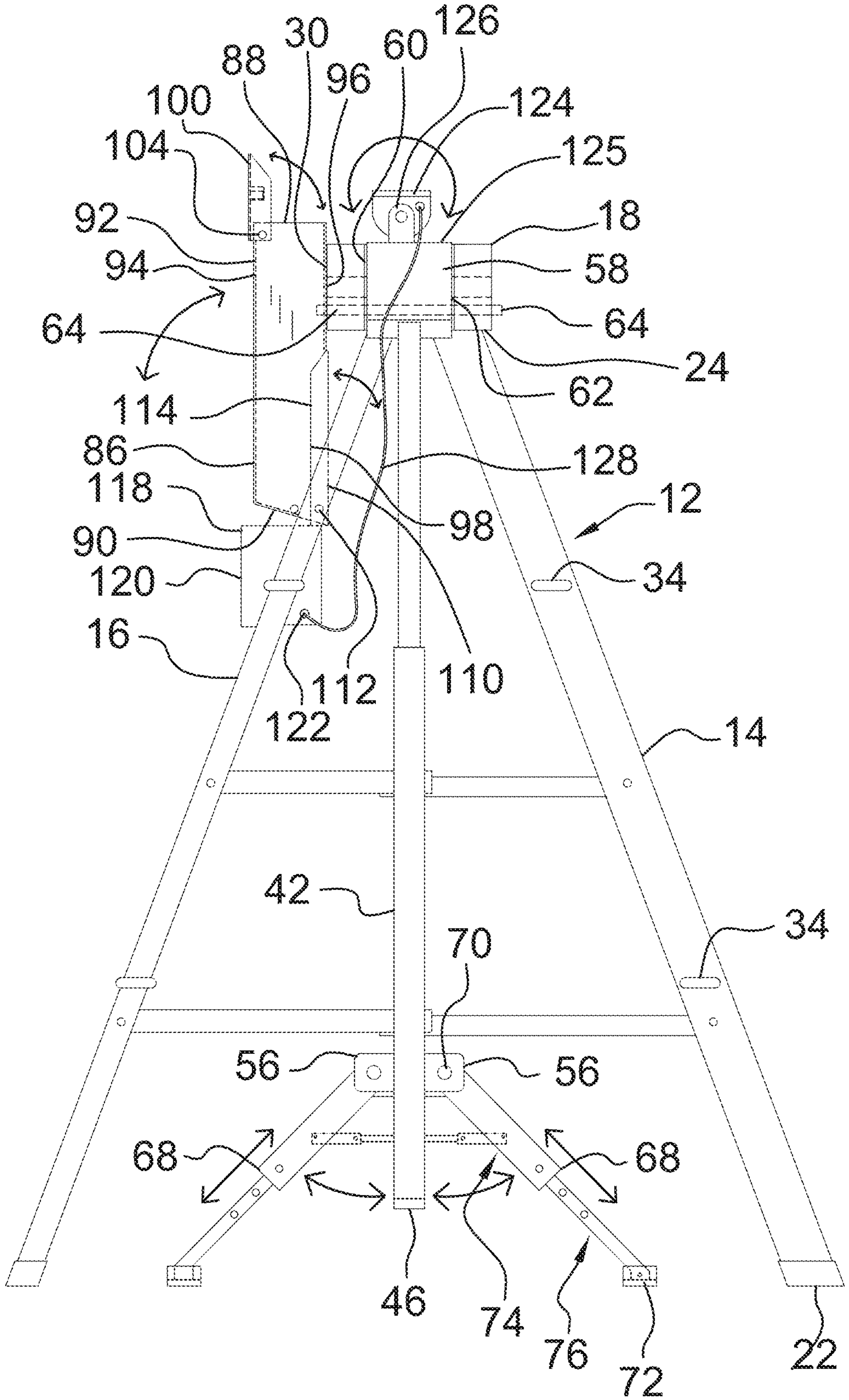
FIG. 3 is a left side view of an embodiment of the disclosure.
Figure 4:
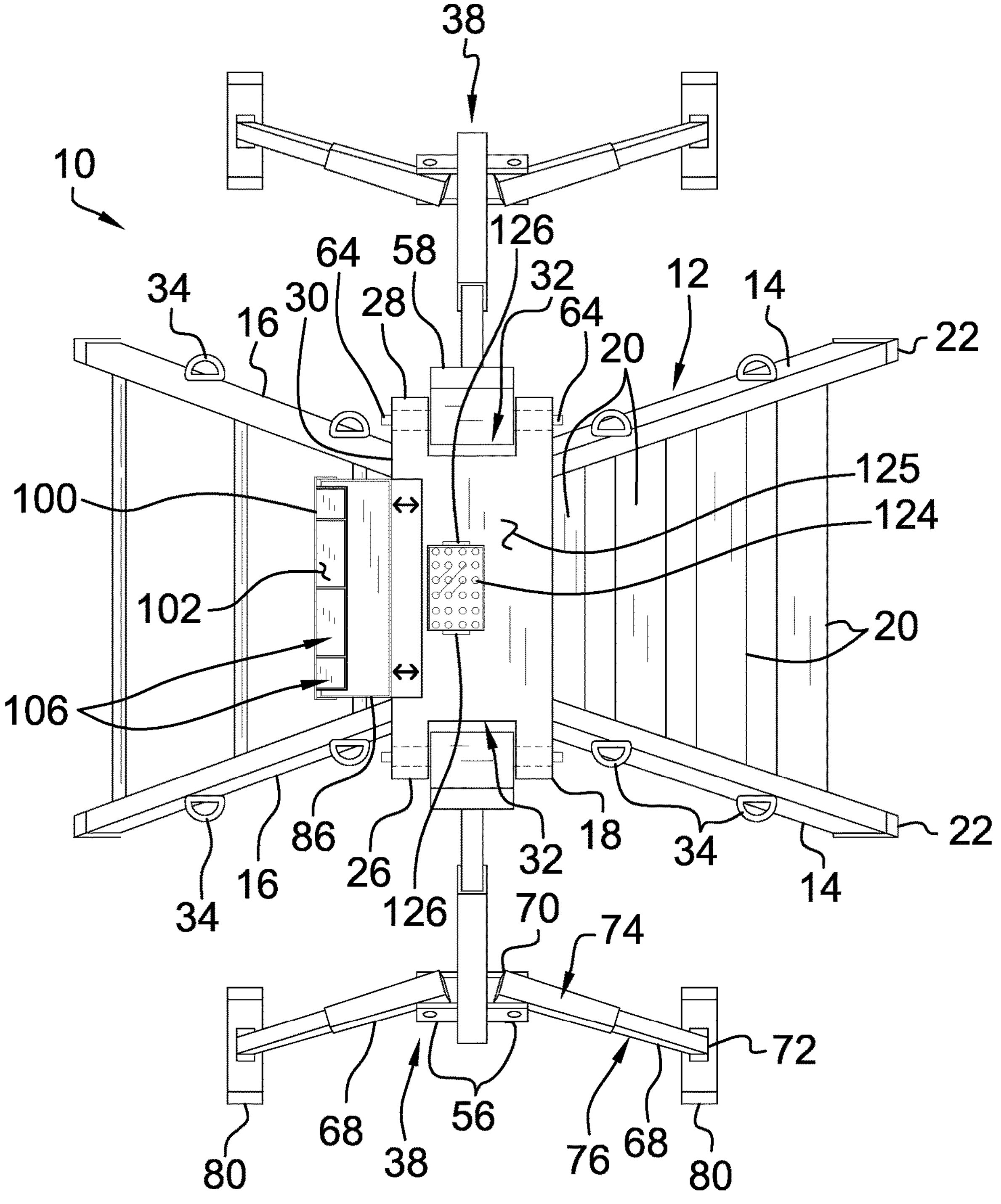
FIG. 4 is a top view of an embodiment of the disclosure.

With reference now to the drawings, and in particular to FIGS. 1 through 4 thereof, a new ladder device embodying the principles and concepts of an embodiment of the disclosure and generally designated by the reference numeral 10 will be described.

As best illustrated in FIGS. 1 through 4, the stabilized ladder assembly 10 generally comprises a step ladder 12 that has a set of climbing legs 14 and a set of support legs 16 each being hingedly coupled to a top support 18. The step ladder 12 includes a plurality of steps 20 each extending between the pair of climbing legs 14 such that the steps 20 are positioned to be climbed. The step ladder 12 is positionable in a deployed position having each of the climbing legs 14 and the set of support legs 16 angling away from the set of support legs 16 in opposite directions from each other. In this way the step ladder 12 can be stood in a vertical orientation. The step ladder 12 is positionable in a collapsed position having the set of climbing legs 14 resting against the set of support legs 16. Each of the climbing legs 14 angles away from each other on the top support 18 such that a bottom end 22 of the climbing legs 14 are spaced further apart from each other than a top end 24 of the climbing legs 14. Additionally, the top support 18 has a first lateral side 26, a second lateral side 28 and a front side 30, and the top support 18 has a pair of slots 32 each extending into a respective one of the first lateral side 26 and the second lateral side 28.

A plurality of loops 34 is provided and each of the loops 34 is coupled to a respective one of the support legs 16 or a respective one of the climbing legs 14. Additionally, a strap 36 can be coupled to any of the loops 34 for stabilizing the step ladder 12. The loops 34 are spaced apart from each other and are distributed along the respective support leg 16 or the respective climbing leg 14. The strap 36 may be a cargo strap or the like and the strap 36 might be attached to an immovable object to inhibit the step ladder 12 from moving.

A pair of lateral supports 38 is included and each of the lateral supports 38 is pivotally disposed on the step ladder 12. Each of the lateral supports 38 is positionable in a deployed position having each of the lateral supports 38 angling laterally away from the step ladder 12 and engaging a support surface 40. In this way each of the lateral supports 38 inhibits the step ladder 12 from tipping laterally on the support surface 40. Each of the lateral supports 38 is positionable in a stored position having the lateral supports 38 resting against the step ladder 12.

Each of the lateral supports 38 includes a pole 42 that has a first end 44 and a second end 46. The pole 42 comprises a first portion 48 which slidably engages a second portion 50 such that the pole 42 has a telescopically adjustable length. The first end 44 is associated with the first portion 48 and the second end 46 is associated with the second portion 50. The pole 42 angles outwardly from the step ladder 12 when the pole 42 is positioned in a deployed position. Conversely, the pole 42 extends downwardly along the step ladder 12 when the pole 42 is positioned in the stored position. The first portion 48 has a plurality of engagement points 52 each being integrated into the first portion 48. The engagement points 52 are spaced apart from each other and are distributed along a substantial length of the first portion 48.

Each of the lateral supports 38 includes a pole lock 54 that is movably integrated into the second portion 50 of the pole 42 and the pole lock 54 releasably engaging a respective one of the plurality of engagement points 52 for retaining the pole 42 at a selected length. The pole lock 54 is biased outwardly from the second portion 50, and the pole lock 54 is urgeable inwardly on the second portion 50. Each of the lateral supports 38 includes a pair of hinge points 56 that is each coupled to and extends away from the second portion 50 in opposite directions from each other. Each of the hinge points 56 is positioned proximate the second end 46.

Each of the lateral supports 38 includes a block 58 that is coupled to the first end 44 of the pole 42, and the block 58 has a first lateral side 60 and a second lateral side 62. The block 58 associated with each of the lateral supports 38 is positioned in a respective one of the slots 32 in the top support 18 of the step ladder 12. Each of the lateral supports 38 includes a pair of pins 64 that is each coupled to and extends laterally away from a respective one of the first lateral side 26 and the second lateral side 28 of the block 58. Each of the pins 64 rotatably engages the top support 18 such that the block 58 is pivotally retained in the respective slot 32 to facilitate the pole 42 to be positioned in the deployed position or the stored position.

Each of the lateral supports 38 includes a pair of block locks 66 that is each movably integrated into a respective one of the first lateral side 26 and the second lateral side 28 of the block 58. Each of the block locks 66 releasably engages the top support 18 when the pole 42 is urged into the deployed position thereby retaining the pole 42 in the deployed position. Each of the block locks 66 is urgeable to disengage the top support 18 to facilitate the pole 42 to be urged into the stored position. Each of the lateral supports 38 includes a pair of supporting legs 68 that each has an upper end 70 and a lower end 72. Each of the supporting legs 68 comprises a primary section 74 which slidably engages a secondary section 76 such that each of the supporting legs 68 has a telescopically adjustable length.

The upper end 70 is associated with the primary section 74 and the lower end 72 is associated with the secondary section 76. The upper end 70 of each of the supporting legs 68 is pivotally coupled to a respective one of the hinge points 56 on the pole 42. Each of the supporting legs 68 is positionable in a deployed position having each of the supporting legs 68 angling away from the pole 42 in opposite directions from each other. Conversely, each of the supporting legs 68 is positionable in a stored position having each of the supporting legs 68 resting against the pole 42.

Each of the lateral supports 38 includes a pair of D-rings 78 that is each coupled to and extends laterally away from the primary section 74 of a respective one of the supporting legs 68. In this way each of the D-rings 78 can be attached to a support for stabilizing the supporting legs 68. Each of the lateral supports 38 includes a pair of feet 80 that each has an upper surface 82 and a lower surface 84. The upper surface 82 is pivotally coupled to the lower end 72 of a respective one of the supporting legs 68 such that each of the feet 80 abuts the support surface 40 thereby laterally stabilizing the step ladder 12.

A toolbox 86 is suspended on the step ladder 12 such that the toolbox 86 is accessible to a user when the user climbs the step ladder 12. The toolbox 86 is oriented to extend along a vertical axis when the step ladder 12 is positioned in the deployed position. The toolbox 86 has a top end 88, a bottom end 90 and an outer wall 92 extending between the top end 88 and the bottom end 90 of the toolbox 86, and the top end 88 of the toolbox 86 is open to access an interior of the toolbox 86. The outer wall 92 has a front side 94 and a back side 96, and the back side 96 is coupled to the front side 30 of the top support 18 of the step ladder 12. The bottom end 90 angles downwardly between the front side 94 and the back side 96 of the outer wall 92, and the back side 96 has an opening 98 extending into the interior of the toolbox 86.

A top lid 100 is hingedly coupled to the toolbox 86 and the top lid 100 is positioned on the top end 24 of the toolbox 86 for opening and closing the toolbox 86. The top lid 100 has a first surface 102 and a lower edge 104, and the lower edge 104 is hingedly disposed on the top end 24 of the toolbox 86. The first surface 102 rests against the top end 88 of the toolbox 86 when the top lid 100 is closed. The first surface 102 has a plurality of storage compartments 106 each disposed on the first surface 102 and each of the storage compartments 106 is exposed when the top lid 100 is opened. A first lock 108 is integrated into the top lid 100 and the first lock 108 engages the top end 88 of the toolbox 86 when the top lid 100 is closed and the first lock 108 is in a locking position for locking the top lid 100. Conversely, the first lock 108 disengages the top end 88 of the toolbox 86 when the first lock 108 is in an unlocked position.

A back lid 110 is hingedly coupled to the toolbox 86 and the back lid 110 is positioned on the back side 96 of the outer wall 92. The back lid 110 has a bottom edge 112 and a forward surface 114, and the bottom edge 112 is hingedly disposed on the bottom end 22 of the toolbox 86. The forward surface 114 abuts the back side 96 of the outer wall 92 of the toolbox 86 having the back lid 110 closing the opening 98 in the back side 96 when the back lid 110 is in a closed position. A second lock 116 is provided and the second lock 116 is integrated into the back lid 110. The second lock 116 engages the back side 96 of the outer wall 92 of the toolbox 86 when the second lock 116 is in a locking position for locking the back lid 110. Conversely, the second lock 116 disengages the back side 96 when the second lock 116 is in an unlocked position.

A power supply 118 is pivotally disposed on the toolbox 86 and the power supply 118 comprises at least one battery 120. The at least one battery 120 has a power output 122 that is integrated into the at least one battery 120. A light emitter 124 is pivotally disposed on the step ladder 12 to emit light outwardly from the step ladder 12. The light emitter 124 is positioned on a top surface 125 of the top support 18 of the of the step ladder 12. The light emitter 124 includes a pair of hinges 126 that is each positioned on opposite sides of the light emitter 124. Each of the hinges 126 is positioned on the top surface 125 of the top support 18 thereby facilitating the light emitter 124 to be directed at a variety of angles on the top surface 125. Additionally, the power cord 128 extends between the light emitter 124 and the power output 122 on the at least one battery 120.

In use, the step ladder 12 is positioned in the deployed position and each of the lateral supports 38 is positioned in the deployed position. In this way the step ladder 12 can be climbed without the risk of tipping laterally as is common with existing step ladder 12*s*. Additionally, a strap 36 can be attached to respective loops 34 for additionally securing the step ladder 12 in an upright orientation. In this way the step ladder 12 can be climbed while holding heavy objects without the risk of the step ladder 12 tipping or falling over due to being off balance. Tools, or any other objects, can be stored in the toolbox 86 such that the tools, or other objects, are accessible when the step ladder 12 is climbed. Additionally, the light emitter 124 can be pivoted to point in a selected direction to illuminate a work area, for example.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A stabilized ladder assembly for inhibiting injuries resulting from falling from a ladder, said assembly comprising:

a step ladder having a set of climbing legs and a set of support legs each being hingedly coupled to a top support, said step ladder including a plurality of steps each extending between said pair of climbing legs wherein said steps are configured to be climbed, said step ladder being positionable in a deployed position having each of said climbing legs and said set of support legs angling away from said set of support legs in opposite directions from each other thereby facilitating said step ladder to be stood in a vertical orientation, said step ladder being positionable in a collapsed position having said set of climbing legs resting against said set of support legs;

a pair of lateral supports, each of said lateral supports being pivotally disposed on said step ladder, each of said lateral supports being positionable in a deployed position having each of said supports angling laterally away from said step ladder and engaging a support surface wherein each of said lateral supports is configured to inhibit said step ladder from tipping laterally on the support surface, each of said lateral supports being positionable in a stored position having said lateral supports resting against said step ladder;

a toolbox being suspended on said step ladder wherein said toolbox is configured to be accessible to a user when the user climbs said step ladder, said toolbox being oriented to extend along a vertical axis when said step ladder is positioned in said deployed position;

wherein said toolbox has a top end, a bottom end and an outer wall extending between said top end and said bottom end, said top end being open to access an interior of said toolbox, said outer wall having a front side and a back side, said back side being coupled to said front side of said top support of said step ladder, said bottom end angling downwardly between said front side and said back side, said back side having an opening extending into said interior of said toolbox; and a top lid being hingedly coupled to said toolbox, said top lid being positioned on said top end of said toolbox for opening and closing said toolbox, said top lid having a first surface and a lower edge, said lower edge being hingedly disposed on said top end of said toolbox, said first surface resting against said top end when said top lid is closed, said first surface having a plurality of storage compartments each being disposed on said first surface, each of said storage compartments being exposed when said top lid is opened.

2. The assembly according to claim 1, wherein:

each of said climbing legs angles away from each other on said top support such that a bottom end of said climbing legs are spaced further apart from each other than a top end of said climbing legs, said top support having a first lateral side, a second lateral side and a front side, said top support having a pair of slots each extending into a respective one of said first lateral side and said second lateral side; and said assembly includes a plurality of loops, each of said loops being coupled to a respective one of said support legs or a respective one of said climbing legs wherein each of said loops is configured to have a strap coupled thereto for stabilizing said step ladder, said loops being spaced apart from each other and being distributed along said respective support leg or said respective climbing leg.

3. The assembly according to claim 1, wherein each of said lateral supports includes:

a pole having a first end and a second end, said pole comprising a first portion slidably engaging a second portion such that said pole has a telescopically adjustable length, said first end being associated with said first portion, said second end being associated with said second portion, said pole angling outwardly from said step ladder when said pole is positioned in a deployed position, said pole extending downwardly along said step ladder when said pole is positioned in said stored position, said first portion having a plurality of engagement points each being integrated into said first portion, said engagement points being spaced apart from each other and being distributed along a substantial length of said first portion; and a pole lock being movably integrated into said second portion, said pole lock releasably engaging a respective one of a plurality of engagement points for retaining said pole at a selected length, said pole lock being biased outwardly from said second portion, said pole lock being urgeable inwardly on said second portion.

4. The assembly according to claim 3, wherein each of said lateral supports includes:

a pair of hinge points, each of said hinge points being coupled to and extending away from said second portion in opposite directions from each other, each of said hinge points being positioned proximate said second end; and a pair of lateral support legs, each of said lateral support legs having an upper end and a lower end, each of said lateral support legs comprising a primary section slidably engaging a secondary section such that each of said lateral support legs has a telescopically adjustable length, said upper end being associated with said primary portion, said lower end being associated with said secondary portion, said upper end of each of said lateral support legs being pivotally coupled to a respective one of said hinge points on said pole, each of said lateral support legs being positionable in a deployed position having each of said lateral support legs angling away from said pole in opposite directions from each other, each of said lateral support legs being positionable in a stored position having each of said lateral support legs resting against said pole.

5. The assembly according to claim 1, further comprising a first lock being integrated into said top lid, said first lock engaging said top end of said toolbox when said top lid is closed and said first lock is in a locking position for locking said top lid, said first lock disengaging said top end when said first lock is in an unlocked position.

6. A stabilized ladder assembly for inhibiting injuries resulting from falling from a ladder, said assembly comprising:

a step ladder having a set of climbing legs and a set of support legs each being hingedly coupled to a top support, said step ladder including a plurality of steps each extending between said pair of climbing legs wherein said steps are configured to be climbed, said step ladder being positionable in a deployed position having each of said climbing legs and said set of support legs angling away from said set of support legs in opposite directions from each other thereby facilitating said step ladder to be stood in a vertical orientation, said step ladder being positionable in a collapsed position having said set of climbing legs resting against said set of support legs;

a pair of lateral supports, each of said lateral supports being pivotally disposed on said step ladder, each of said lateral supports being positionable in a deployed position having each of said supports angling laterally away from said step ladder and engaging a support surface wherein each of said lateral supports is configured to inhibit said step ladder from tipping laterally on the support surface, each of said lateral supports being positionable in a stored position having said lateral supports resting against said step ladder;

a toolbox being suspended on said step ladder wherein said toolbox is configured to be accessible to a user when the user climbs said step ladder, said toolbox being oriented to extend along a vertical axis when said step ladder is positioned in said deployed position;

wherein each of said lateral supports includes a pole having a first end and a second end, said pole comprising a first portion slidably engaging a second portion such that said pole has a telescopically adjustable length, said first end being associated with said first portion, said second end being associated with said second portion, said pole angling outwardly from said step ladder when said pole is positioned in a deployed position, said pole extending downwardly along said step ladder when said pole is positioned in said stored position, said first portion having a plurality of engagement points each being integrated into said first portion, said engagement points being spaced apart from each other and being distributed along a substantial length of said first portion, a pole lock being movably integrated into said second portion, said pole lock releasably engaging a respective one of a plurality of engagement points for retaining said pole at a selected length, said pole lock being biased outwardly from said second portion, said pole lock being urgcable inwardly on said second portion, a block being coupled to said first end of said pole, said block having a first lateral side and a second lateral side, said block associated with each of said lateral supports being positioned in a respective one of said slots in said top support of said step ladder, a pair of pins, each of said pins being coupled to and extending laterally away from a respective one of said first lateral side and said second lateral side of said block, each of said pins rotatably engaging said top support such that said block is pivotally retained in said respective slot to facilitate said pole to be positioned in said deployed position or said stored position, and a pair of block locks, each of said block locks being movably integrated into a respective one of said first lateral side and said second lateral side of said block, each of said block locks releasably engaging said top support when said pole is urged into said deployed position thereby retaining said pole in said deployed position, each of said block locks being urgeable to disengage said top support to facilitate said pole to be urged into said stored position.

7. A stabilized ladder assembly for inhibiting injuries resulting from falling from a ladder, said assembly comprising:

a step ladder having a set of climbing legs and a set of support legs each being hingedly coupled to a top support, said step ladder including a plurality of steps each extending between said pair of climbing legs wherein said steps are configured to be climbed, said step ladder being positionable in a deployed position having each of said climbing legs and said set of support legs angling away from said set of support legs in opposite directions from each other thereby facilitating said step ladder to be stood in a vertical orientation, said step ladder being positionable in a collapsed position having said set of climbing legs resting against said set of support legs;

a pair of lateral supports, each of said lateral supports being pivotally disposed on said step ladder, each of said lateral supports being positionable in a deployed position having each of said supports angling laterally away from said step ladder and engaging a support surface wherein each of said lateral supports is configured to inhibit said step ladder from tipping laterally on the support surface, each of said lateral supports being positionable in a stored position having said lateral supports resting against said step ladder;

a toolbox being suspended on said step ladder wherein said toolbox is configured to be accessible to a user when the user climbs said step ladder, said toolbox being oriented to extend along a vertical axis when said step ladder is positioned in said deployed position; and wherein each of said lateral supports includes a pole having a first end and a second end, said pole comprising a first portion slidably engaging a second portion such that said pole has a telescopically adjustable length, said first end being associated with said first portion, said second end being associated with said second portion, said pole angling outwardly from said step ladder when said pole is positioned in a deployed position, said pole extending downwardly along said step ladder when said pole is positioned in said stored position, said first portion having a plurality of engagement points each being integrated into said first portion, said engagement points being spaced apart from each other and being distributed along a substantial length of said first portion, a pole lock being movably integrated into said second portion, said pole lock releasably engaging a respective one of a plurality of engagement points for retaining said pole at a selected length, said pole lock being biased outwardly from said second portion, said pole lock being urgeable inwardly on said second portion, a pair of hinge points, each of said hinge points being coupled to and extending away from said second portion in opposite directions from each other, each of said hinge points being positioned proximate said second end, a pair of lateral support legs, each of said lateral support legs having an upper end and a lower end, each of said lateral support legs comprising a primary section slidably engaging a secondary section such that each of said lateral support legs has a telescopically adjustable length, said upper end being associated with said primary portion, said lower end being associated with said secondary portion, said upper end of each of said lateral support legs being pivotally coupled to a respective one of said hinge points on said pole, each of said lateral support legs being positionable in a deployed position having each of said lateral support legs angling away from said pole in opposite directions from each other, each of said lateral support legs being positionable in a stored position having each of said lateral support legs resting against said pole, a pair of D-rings, each of said D-rings being coupled to and extending laterally away from said primary portion of a respective one of said lateral support legs wherein each of said D-rings is configured to be attached to a support for stabilizing said lateral support legs, and a pair of feet, each of said feet having an upper surface and a lower surface, said upper surface being pivotally coupled to said lower end of a respective one of said lateral support legs wherein said lower surface of each of said feet is configured to abut a support surface thereby laterally stabilizing said step ladder.

8. A stabilized ladder assembly for inhibiting injuries resulting from falling from a ladder, said assembly comprising:

a step ladder having a set of climbing legs and a set of support legs each being hingedly coupled to a top support, said step ladder including a plurality of steps each extending between said pair of climbing legs wherein said steps are configured to be climbed, said step ladder being positionable in a deployed position having each of said climbing legs and said set of support legs angling away from said set of support legs in opposite directions from each other thereby facilitating said step ladder to be stood in a vertical orientation, said step ladder being positionable in a collapsed position having said set of climbing legs resting against said set of support legs;

a pair of lateral supports, each of said lateral supports being pivotally disposed on said step ladder, each of said lateral supports being positionable in a deployed position having each of said supports angling laterally away from said step ladder and engaging a support surface wherein each of said lateral supports is configured to inhibit said step ladder from tipping laterally on the support surface, each of said lateral supports being positionable in a stored position having said lateral supports resting against said step ladder:

a toolbox being suspended on said step ladder wherein said toolbox is configured to be accessible to a user when the user climbs said step ladder, said toolbox being oriented to extend along a vertical axis when said step ladder is positioned in said deployed position;

wherein said toolbox has a top end, a bottom end and an outer wall extending between said top end and said bottom end, said top end being open to access an interior of said toolbox, said outer wall having a front side and a back side, said back side being coupled to said front side of said top support of said step ladder, said bottom end angling downwardly between said front side and said back side, said back side having an opening extending into said interior of said toolbox; and a back lid being hingedly coupled to said toolbox, said back lid being positioned on said back side of said outer wall, said back lid having a bottom edge and a forward surface, said bottom edge being hingedly disposed on said bottom end of said toolbox, said forward surface abutting said back side of said outer wall of said toolbox having said back lid closing said opening in said back side when said back lid is in a closed position.

9. The assembly according to claim 8, further comprising:

a first lock; and a second lock being integrated into said back lid, said second lock engaging said back side of said outer wall of said toolbox when said second lock is in a locking position for locking said back lid, said second lock disengaging said back side when said second lock is in an unlocked position.

10. A stabilized ladder assembly for inhibiting injuries resulting from falling from a ladder, said assembly comprising:

a step ladder having a set of climbing legs and a set of support legs each being hingedly coupled to a top support, said step ladder including a plurality of steps each extending between said pair of climbing legs wherein said steps are configured to be climbed, said step ladder being positionable in a deployed position having each of said climbing legs and said set of support legs angling away from said set of support legs in opposite directions from each other thereby facilitating said step ladder to be stood in a vertical orientation, said step ladder being positionable in a collapsed position having said set of climbing legs resting against said set of support legs, each of said climbing legs angling away from each other on said top support such that a bottom end of said climbing legs are spaced further apart from each other than a top end of said climbing legs, said top support having a first lateral side and a second lateral side, said top support having a pair of slots each extending into a respective one of said first lateral side and said second lateral side;

a plurality of loops, each of said loops being coupled to a respective one of said support legs or a respective one of said climbing legs wherein each of said loops is configured to have a strap coupled thereto for stabilizing said step ladder, said loops being spaced apart from each other and being distributed along said respective support leg or said respective climbing leg;

a pair of lateral supports, each of said lateral supports being pivotally disposed on said step ladder, each of said lateral supports being positionable in a deployed position having each of said supports angling laterally away from said step ladder and engaging a support surface wherein each of said lateral supports is configured to inhibit said step ladder from tipping laterally on the support surface, each of said lateral supports being positionable in a stored position having said lateral supports resting against said step ladder, each of said lateral supports including:

a pole having a first end and a second end, said pole comprising a first portion slidably engaging a second portion such that said pole has a telescopically adjustable length, said first end being associated with said first portion, said second end being associated with said second portion, said pole angling outwardly from said step ladder when said pole is positioned in a deployed position, said pole extending downwardly along said step ladder when said pole is positioned in said stored position, said first portion having a plurality of engagement points each being integrated into said first portion, said engagement points being spaced apart from each other and being distributed along a substantial length of said first portion;

a pole lock being movably integrated into said second portion, said pole lock releasably engaging a respective one of a plurality of engagement points for retaining said pole at a selected length, said pole lock being biased outwardly from said second portion, said pole lock being urgeable inwardly on said second portion;

a pair of hinge points, each of said hinge points being coupled to and extending away from said second portion in opposite directions from each other, each of said hinge points being positioned proximate said second end;

a block being coupled to said first end of said pole, said block having a first lateral side and a second lateral side, said block associated with each of said lateral supports being positioned in a respective one of said slots in said top support of said step ladder;

a pair of pins, each of said pins being coupled to and extending laterally away from a respective one of said first lateral side and said second lateral side of said block, each of said pins rotatably engaging said top support such that said block is pivotally retained in said respective slot to facilitate said pole to be positioned in said deployed position or said stored position;

a pair of block locks, each of said block locks being movably integrated into a respective one of said first lateral side and said second lateral side of said block, each of said block locks releasably engaging said top support when said pole is urged into said deployed position thereby retaining said pole in said deployed position, each of said block locks being urgeable to disengage said top support to facilitate said pole to be urged into said stored position;

a pair of support legs, each of said support legs having an upper end and a lower end, each of said support legs comprising a primary section slidably engaging a secondary section such that each of said support legs has a telescopically adjustable length, said upper end being associated with said primary portion, said lower end being associated with said secondary portion, said upper end of each of said support legs being pivotally coupled to a respective one of said hinge points on said pole, each of said support legs being positionable in a deployed position having each of said support legs angling away from said pole in opposite directions from each other, each of said support legs being positionable in a stored position having each of said support legs resting against said pole;

a pair of D-rings, each of said D-rings being coupled to and extending laterally away from said primary portion of a respective one of said support legs wherein each of said D-rings is configured to be attached to a support for stabilizing said support legs; and a pair of feet, each of said feet having an upper surface and a lower surface, said upper surface being pivotally coupled to said lower end of a respective one of said support legs wherein said lower surface of each of said feet is configured to abut a support surface thereby laterally stabilizing said step ladder;

a toolbox being suspended on said step ladder wherein said toolbox is configured to be accessible to a user when the user climbs said step ladder, said toolbox being oriented to extend along a vertical axis when said step ladder is positioned in said deployed position, said toolbox having a top end, a bottom end and an outer wall extending between said top end and said bottom end, said top end being open to access an interior of said toolbox, said outer wall having a front side and a back side, said back side being coupled to said front side of said top support of said step ladder, said bottom end angling downwardly between said front side and said back side, said back side having an opening extending into said interior of said toolbox;

a top lid being hingedly coupled to said toolbox, said top lid being positioned on said top end of said toolbox for opening and closing said toolbox, said top lid having a first surface and a lower edge, said lower edge being hingedly disposed on said top end of said toolbox, said first surface resting against said top end when said top lid is closed, said first surface having a plurality of storage compartments each being disposed on said first surface, each of said storage compartments being exposed when said top lid is opened;

a first lock being integrated into said top lid, said first lock engaging said top end of said toolbox when said top lid is closed and said first lock is in a locking position for locking said top lid, said first lock disengaging said top end when said first lock is in an unlocked position;

a back lid being hingedly coupled to said toolbox, said back lid being positioned on said back side of said outer wall, said back lid having a bottom edge and a forward surface, said bottom edge being hingedly disposed on said bottom end of said toolbox, said forward surface abutting said back side of said outer wall of said toolbox having said back lid closing said opening in said back side when said back lid is in a closed position;

a second lock being integrated into said back lid, said second lock engaging said back side of said outer wall of said toolbox when said second lock is in a locking position for locking said back lid, said second lock disengaging said back side when said second lock is in an unlocked position;

a power supply being pivotally disposed on said toolbox, said power supply comprising at least one battery, said at least one battery having a power output being integrated into said at least one battery;

a light emitter being pivotally disposed on said step ladder wherein said light emitter is configured to emit light outwardly from said step ladder, said light emitter being positioned on a top surface of said top support of said of said step ladder, said light emitter including a pair of hinges each being positioned on opposite sides of said light emitter, each of said hinges being positioned on said top surface of said top support thereby facilitating said light emitter to be directed at a variety of angles on said top surface.

* * * * *